(12) United States Patent
    Shi et al.

(10) Patent No.: US 11,641,691 B2
(45) Date of Patent: May 2, 2023

(54) METHOD AND DEVICE FOR DISCONTINUOUS TRANSMISSION

(71) Applicant: GUANGDONG OPPO MOBILE TELECOMMUNICATIONS CORP., LTD., Guangdong (CN)

(72) Inventors: Cong Shi, Guangdong (CN); Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 178 days.

(21) Appl. No.: 16/929,277

(22) Filed: Jul. 15, 2020

(65) Prior Publication Data

US 2020/0344840 A1    Oct. 29, 2020

Related U.S. Application Data

(63) Continuation of application No. PCT/CN2018/074844, filed on Jan. 31, 2018.

(51) Int. Cl.
    *H04W 72/04* (2009.01)
    *H04W 76/28* (2018.01)
    *H04W 24/08* (2009.01)
    *H04W 72/0446* (2023.01)

(52) U.S. Cl.
    CPC ........... *H04W 76/28* (2018.02); *H04W 24/08* (2013.01); *H04W 72/042* (2013.01); *H04W 72/0446* (2013.01)

(58) Field of Classification Search
    CPC ..... H04W 76/19; H04W 76/28; H04W 76/27; H04W 24/08; H04W 72/0446; H04W 72/042; H04W 80/02; H04W 52/0229; H04W 52/0235
    See application file for complete search history.

(56) References Cited

U.S. PATENT DOCUMENTS

| | | | |
|---|---|---|---|
| 2011/0199910 A1 | 8/2011 | Oh et al. | |
| 2013/0215809 A1* | 8/2013 | Chang | H04W 76/28 370/311 |
| 2017/0131994 A1* | 5/2017 | Middleton | H04W 24/00 |
| 2017/0339682 A1 | 11/2017 | Lee et al. | |

(Continued)

FOREIGN PATENT DOCUMENTS

| | | |
|---|---|---|
| CN | 102256321 A | 11/2011 |
| CN | 102461320 A | 5/2012 |

(Continued)

OTHER PUBLICATIONS

International Search Report dated Oct. 11, 2018 of PCT/CN2018/074844 (4 pages).

(Continued)

*Primary Examiner* — Wei Zhao

(74) *Attorney, Agent, or Firm* — Perkins Coie LLP

(57) ABSTRACT

Disclosed in the present disclosure are a method and a device for discontinuous transmission, the method comprising: a terminal device monitors a physical downlink control channel PDCCH in a DRX activation period; if the DRX timer starts and/or times out in the PDCCH monitoring time, then the DRX activation period includes the PDCCH monitoring time, or the DRX activation period does not include the PDCCH monitoring time.

20 Claims, 6 Drawing Sheets

(56) References Cited

U.S. PATENT DOCUMENTS

| | | | | |
|---|---|---|---|---|
| 2018/0352582 | A1* | 12/2018 | Yi | H04W 74/006 |
| 2020/0245395 | A1* | 7/2020 | Zhang | H04L 5/0053 |

FOREIGN PATENT DOCUMENTS

| | | | |
|---|---|---|---|
| CN | 102548013 | A | 7/2012 |
| CN | 106034318 | A | 10/2016 |
| CN | 106899941 | A | 6/2017 |
| CN | 107257564 | A | 10/2017 |
| KR | 20100137507 | A | 12/2010 |
| WO | 2016186016 | A1 | 11/2016 |

OTHER PUBLICATIONS

Yang, Jun et al., Introduction on Principle of and Optimization of LTE DRX (China New Telecommunications), No. No. 13, Jul. 5, 2015 (Jul. 5, 2015), ISSN: 1673-4866., pp. 20-22.(8 pages).

CNIPA, Second Office Action for Chinese Application No. 202010595493.3, dated Aug. 20, 2021. 14 pages with English translation.

IP India, Examination Report for Indian Application No. 202017032340, dated Jul. 29, 2021. 5 pages with English translation.

JPO, Notice of Reasons for Refusal for Japanese Application No. 2020-540774, dated Sep. 17, 2021. 5 pages with English translation.

OPPO "CR on DRX Active Time" R2-1801301; 3GPP TSG-RAN2 Meeting AH#1, Jan. 22-26, 2018. 2 pages.

OPPO et al. "UE behavior on DRX timer operation" R2-1800073; 3GPP TSG-RAN2 Meeting AH#1; Jan. 22-26, 2018. 5 pages.

CNIPA, First Office Action for Chinese Patent Application No. 202010595493.3, dated May 28, 2021. 10 pages with English translation.

3 GPP TS 36.321 V8.11.0 (Dec. 2011)—3rd Generation Partnership Project; Technical Specification Group Radio Access Network; Evolved Universal Terrestrial Radio Access (E-UTRA); Medium Access Control (MAC) protocol specification (Release 8) (47 pages).

Supplementary European Search Report dated Dec. 21, 2020 of European Patent Application No. 18903421.8 (11 pages).

PANTech: "Definition of PDCCH-subframe and DRX timers", 3GPP Draft; R2-122911 Definition of PDCCH-Subframe and DRX Timers(V3.3), 3rd Generation Partnership Project (3GPP), Mobile Competence Centre,650, Route Des Lucioles , F-06921 Sophia-Antipolis Cedex , France, vol. RAN WG2, No. Prague, Czech; May 21, 2012 May 25, 2012, May 15, 2012 (May 15, 2012), XP050607463, [retrieved on May 15, 2012] * pp. 1-4 *.

ZTE: "Consideration on DRX", 3GPP Draft; R2-1706647 Consideration on the DRX, 3rd Generation Partnership Project (3GPP), Mobile Competence Centre , 650, Route Des Lucioles, F-06921 Sophia-Antipolis Cedex ,France, vol. RAN WG2, No. Qingdao, China; Jun. 27, 2017-Jun. 29, 2017 Jun. 26, 2017 (Jun. 26, 2017), XP051301149, Retrieved from the Internet: URL:http://www.3gpp.org/ftp/Meetings -3GPP-SYNC/RAN2/Docs/[retrieved on Jun. 26, 2017] * pp. 1-5.

Examination Report dated Oct. 20, 2021 of European Patent Application No. 18903421.8 (8 pages).

Third Examination Report dated Nov. 10, 2021 of Chinese Patent Application No. 202010595493.3 with English translation (15 pages).

IPA, Examination Report No. 1 for Australian Patent Application No. 2018405905, dated Jan. 21, 2021. 4 pages.

KIPO, Notification of Reason for Refusal for Korean Patent Application No. 10-2020-7023792, dated Mar. 23, 2021. 10 pages with English translation.

Decision of Rejection for Chinese Application No. 202010595493.3 dated Jan. 24, 2022. 9 pages with English translation.

First Examination Report of the European application No. 18903421.8, dated May 2, 2022. 8 pages.

First Written Opinion of the Singaporean application No. 11202007186S, dated May 24, 2022. 5 pages.

Examination Report for European Application No. 18903421.8 dated Nov. 11, 2022. 9 pages.

* cited by examiner

METHOD AND DEVICE FOR DISCONTINUOUS TRANSMISSION

CROSS-REFERENCE TO RELATED APPLICATION

The present application is a continuation application of International Application No. PCT/CN2018/074844 filed on Jan. 31, 2018, which is hereby incorporated by reference in its entirety.

TECHNICAL FIELD

Implementations of the present disclosure relate to the field of communication, and more particularly, to a method and device for Discontinuous Reception (DRX).

BACKGROUND

A DRX mechanism is introduced for power saving of a terminal device. A network device may configure the terminal device to "wake up" at a time known in advance by the network device and to monitor a downlink control channel when the terminal device wakes up, or may configure the terminal device to "sleep" at a time known in advance by the network device and not to monitor the downlink control channel when the terminal device is sleeping. In this way, if the network device has data to transmit to the terminal device, the terminal device may be scheduled during a wake-up time of the terminal device, and the terminal device may reduce power consumption during a sleep time.

In a 5G system, durations and positions of waking-up and sleeping of a terminal device may be flexibly changed, which may affect monitoring of a control channel by the terminal device. Therefore, in the 5G system, how to ensure the terminal device to effectively monitor a downlink control channel becomes an urgent problem to be solved.

SUMMARY

Implementations of the present disclosure provide a method and device for discontinuous reception, which may ensure a terminal device to effectively monitor a downlink control channel.

In a first aspect, a method for discontinuous reception is provided. The method includes that a terminal device monitors a physical downlink control channel (PDCCH) during a Discontinuous Reception (DRX) active time; wherein, if a DRX timer starts and/or expires in a PDCCH monitoring occasion, the DRX active time includes the PDCCH monitoring occasion, or the DRX active time does not include the PDCCH monitoring occasion.

In one possible implementation, the PDCCH monitoring occasion includes one or more consecutive time domain symbols.

In one possible implementation, the PDCCH monitoring occasion is configured by a network device.

In one possible implementation, the DRX timer is any one of the following timers: a DRX onDuration Timer, a DRX Inactivity Timer, a DRX Retransmission TimerUL, a DRX Retransmission TimerDL, and a Contention Resolution Timer.

In one possible implementation, that the DRX timer starts and/or expires in the PDCCH monitoring occasion includes that a starting or expiry time of the DRX timer is located in the PDCCH monitoring occasion except a starting time and an ending time of the PDCCH monitoring occasion.

In one possible implementation, that the DRX timer starts and/or expires in the PDCCH monitoring occasion includes that a starting time of the DRX timer is located after a starting time of the PDCCH monitoring occasion, and an expiry time of the DRX timer is located before an ending time of the PDCCH monitoring occasion.

In one possible implementation, the method further includes that if the terminal device detects the PDCCH in the PDCCH monitoring occasion, the terminal device starts or restarts a DRX onDuration Timer.

In a second aspect, a terminal device is provided. The terminal device may perform operations of the terminal device in the first aspect or any optional implementation of the first aspect. Specifically, the terminal device includes terminal devices for implementing the method in the above first aspect or any possible implementation of the above first aspect.

In a third aspect, a terminal device is provided. The terminal device includes a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to implement the method in the first aspect or any possible implementation of the first aspect, or the execution causes the terminal device to implement the terminal device provided in the second aspect.

In a fourth aspect, a system chip is provided. The system chip includes an input interface, an output interface, a processor, and a memory, wherein the processor is used for executing instructions stored in the memory, and when the instructions are executed, the processor may implement the method in the first aspect or any possible implementation of the above first aspect.

In a fifth aspect, a computer program product containing instructions is provided. When the computer program product is run on a computer, the computer is caused to perform the method in the first aspect or any possible implementation of the first aspect.

DETAILED DESCRIPTION

Technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, or a future 5G system.

Figure 1:
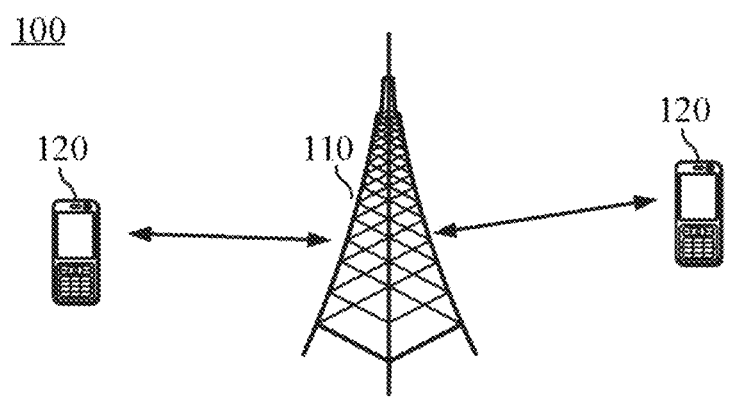
FIG. 1 is a schematic diagram of a wireless communication system according to an implementation of the present disclosure.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area, and may communicate with the terminal device (e.g., UE) in the coverage area. Optionally, the network device 100 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, Device to Device (D2D) communication may be performed between the terminal devices 120.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within a coverage area of each network device, and implementations of the present disclosure do not limit these.

Optionally, the wireless communication system 100 may further include other network entities such as a network controller, a mobile management entity, and implementations of the present disclosure do not limit these.

Figure 2:
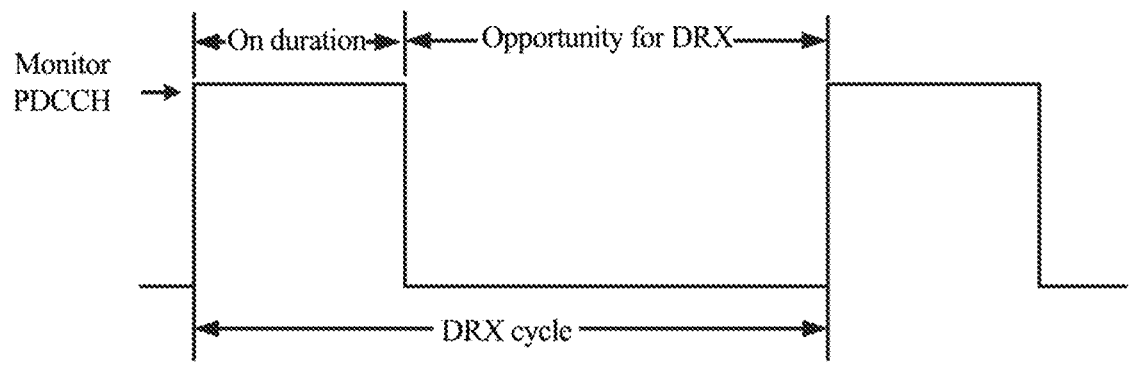
FIG. 2 is a schematic diagram of a DRX cycle.

In a LTE system, a Media Access Control (MAC) entity is configured with a Discontinuous Reception (DRX) function by Radio Resource Control (RRC) to control a behavior of monitoring a Physical Downlink Control Channel (PDCCH) of a terminal device. For example, as shown in FIG. 2, in an RRC CONNECTED mode, if the terminal device is configured with the DRX function, the MAC entity may continuously monitor the PDCCH during an On Duration and not monitor the PDCCH during an Opportunity for DRX, thereby reducing power consumption of the terminal device. The network device may configure a set of DRX parameters for the MAC entity through RRC signaling, for example, configure a series of DRX timers, to manage wake-up and sleep states of the terminal device. According to values of these parameters, a DRX cycle as shown in FIG. 2 may be obtained.

In a 5G system, time and positions of wake-up and sleep states of a terminal device may be flexibly changed, which may affect monitoring of a control channel by the terminal device.

Therefore, in the implementation of the present disclosure, when a DRX timer starts and/or expires in a PDCCH monitoring occasion, since a DRX active time of a terminal device includes the PDCCH monitoring occasion or the DRX active time does not include the PDCCH monitoring occasion, it can ensure that the terminal device monitors the downlink control channel more effectively.

It should be understood that the term "monitoring" in implementations of the present disclosure may also be referred to as listening, sensing, detecting, checking, etc. In addition, an Active Time of the terminal device may be referred to as an active period, on duration, a wake-up time, etc.

Figure 3:
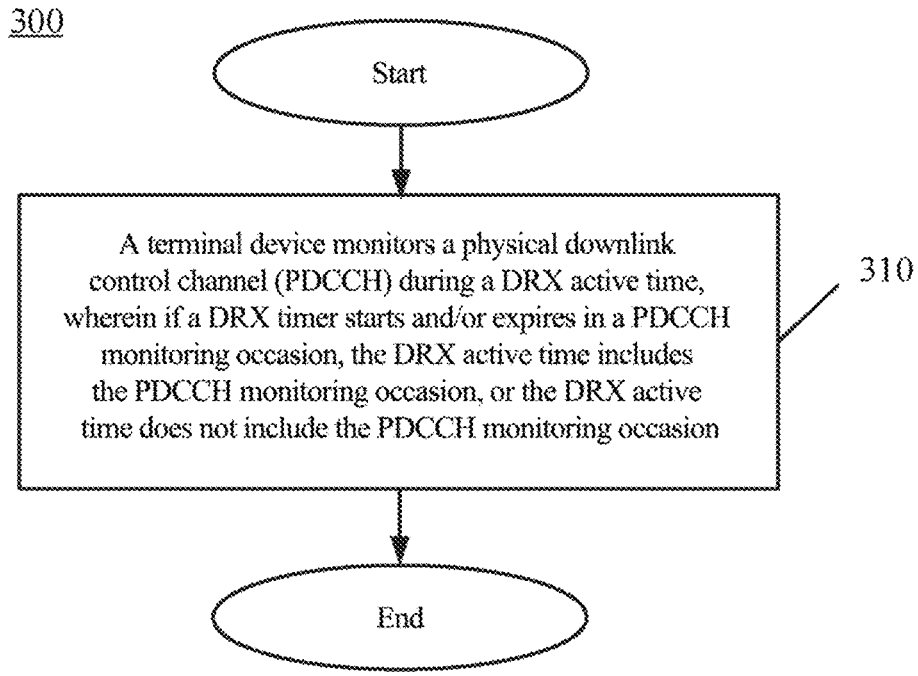
FIG. 3 is a schematic flow chart of a method for discontinuous reception according to an implementation of the present disclosure.

FIG. 3 is a schematic flow chart of a method for discontinuous reception according to an implementation of the present disclosure. A terminal device shown in FIG. 3 may be, for example, the terminal device 120 shown in FIG. 1. As shown in FIG. 3, the method for discontinuous reception includes act 310.

In 310, a terminal device monitors a physical downlink control channel (PDCCH) during a discontinuous reception (DRX) active time.

Herein, if a DRX timer starts and/or expires in a PDCCH monitoring occasion, the DRX active time includes the PDCCH monitoring occasion, or the DRX active time does not include the PDCCH monitoring occasion.

Therefore, when the DRX timer starts and/or expires in the PDCCH monitoring occasion, since the DRX active time of the terminal device does not include the PDCCH monitoring occasion, or the DRX active time includes the PDCCH monitoring occasion, a process of monitoring the PDCCH by the terminal device is not affected.

Optionally, the PDCCH monitoring occasion may include one or more consecutive time domain symbols.

In addition, optionally, the PDCCH monitoring occasion is configured by a network device. For example, the network device may send configuration information to the terminal device to indicate a time domain location of the PDCCH.

Optionally, the DRX timer may be any one of the following timers: a DRX onDuration Timer (drx-onDurationTimer); a DRX Inactivity Timer (drx-InactivityTimer); a DRX Retransmission TimerUL (drx-RetransmissionTimerUL); a DRX Retransmission TimerDL (drx-RetransmissionTimerDL); and a Contention Resolution Timer (mac-ContentionResolutionTimer).

Optionally, in 310, that the DRX timer starts and/or expires in the PDCCH monitoring occasion includes that a starting or expiry time of the DRX timer is located in the PDCCH monitoring occasion except a starting time and an ending time of the PDCCH monitoring occasion.

That is, the starting or expiry time of the DRX timer is located after the starting time of the PDCCH monitoring occasion and before the ending time of the PDCCH monitoring occasion.

Optionally, in 310, that the DRX timer starts and/or expires in the PDCCH monitoring occasion includes that a starting time of the DRX timer is located after a starting time of the PDCCH monitoring occasion, and an expiry time of the DRX timer is located before an ending time of the PDCCH monitoring occasion.

Optionally, the method may further include that if the terminal device detects the PDCCH in the PDCCH monitoring occasion, the terminal device starts or restarts a DRX onDuration Timer.

Generally, if the DRX timer starts and/or expires in the PDCCH monitoring occasion, a process of monitoring the PDCCH by the terminal device may be affected. For example, if a drx-InactivityTimer expires in a PDCCH monitoring occasion of the terminal device, the terminal device will stop monitoring the PDCCH, thus affecting the process of monitoring the PDCCH by the terminal device.

However, in the implementation of the present disclosure, since it is determined that the DRX active time includes the PDCCH monitoring occasion, or the DRX active time does not include the PDCCH monitoring occasion, it can ensure that the terminal device monitors the downlink control channel more effectively.

For example, assuming that it is agreed that the DRX active time includes the PDCCH monitoring occasion, when the drx-InactivityTimer expires in a PDCCH monitoring occasion of the terminal device, since the DRX active time includes an entire time domain length corresponding to the PDCCH monitoring occasion, the terminal device still monitors the PDCCH in the PDCCH monitoring occasion, thus avoiding an influence on the process of monitoring the PDCCH.

Below, the case that the DRX active time includes the PDCCH monitoring occasion and the case that the DRX active time does not include the PDCCH monitoring occasion are described in detail by taking FIGS. 4 to 9 as examples.

Figure 4:
FIG. 4 is a schematic block diagram of a DRX active time according to an implementation of the present disclosure.
Figure 4:
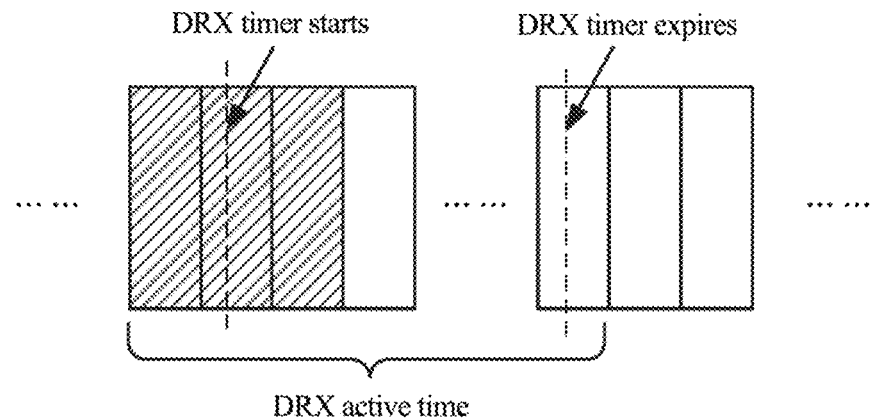

As shown in FIG. 4, the DRX active time includes the PDCCH monitoring occasion. Assuming that a network device configures the PDCCH monitoring occasion to be the first three time domain symbols of a subframe, if a DRX timer starts in the second time domain symbol of the subframe, a terminal device needs to monitor the PDCCH in the first three time domain symbols until the DRX timer expires.

Figure 5:
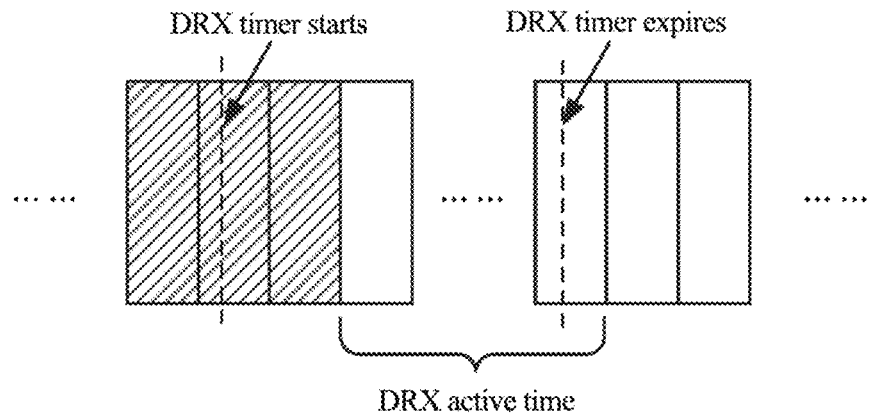
FIG. 5 is a schematic block diagram of a DRX active time according to an implementation of the present disclosure.

As shown in FIG. 5, the DRX active time does not include the PDCCH monitoring occasion. Assuming that the network device configures the PDCCH monitoring occasion to be the first three time domain symbols of a subframe, if a DRX timer starts in the second time domain symbol of the subframe, the terminal device needs to start monitoring the PDCCH from the fourth time domain symbol until the DRX timer expires.

Figure 6:
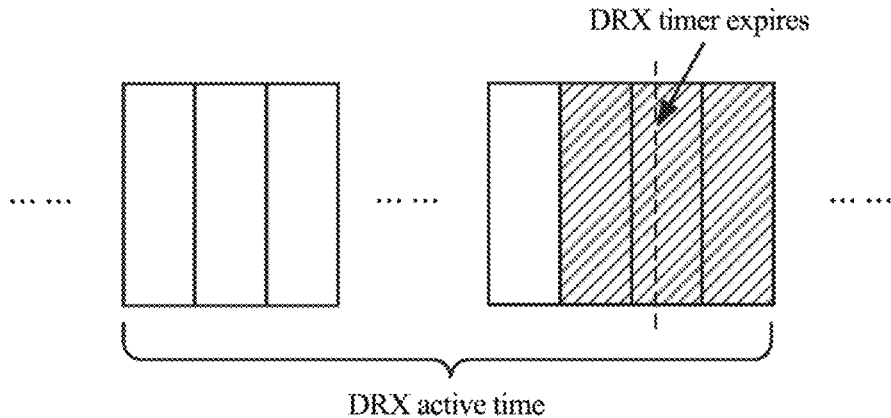
FIG. 6 is a schematic block diagram of a DRX active time according to an implementation of the present disclosure.

As shown in FIG. 6, the DRX active time includes the PDCCH monitoring occasion. Assuming that the network device configures the PDCCH monitoring occasion to be the first three time domain symbols of a subframe, if a DRX timer expires in the second time domain symbol of the subframe, the terminal device needs to continue monitoring the PDCCH in the three time domain symbols.

Figure 7:
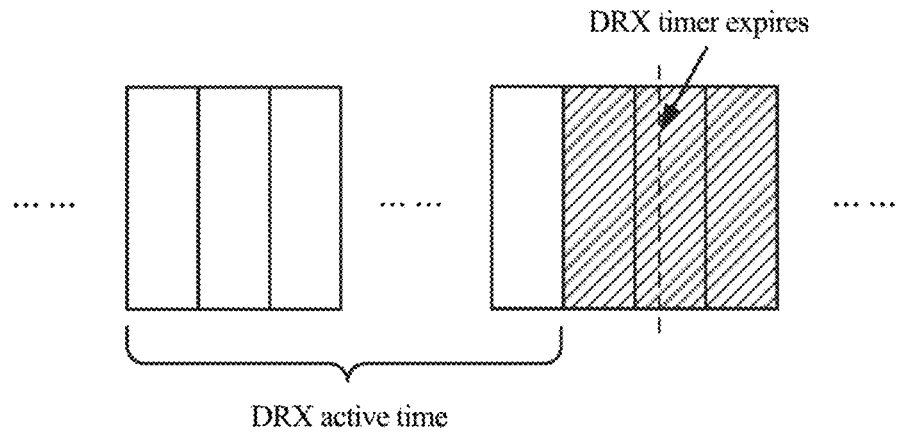
FIG. 7 is a schematic block diagram of a DRX active time according to an implementation of the present disclosure.

As shown in FIG. 7, the DRX active time does not include the PDCCH monitoring occasion. Assuming that the network device configures the PDCCH monitoring occasion to be the first three time domain symbols of a subframe, if a DRX timer expires in the second time domain symbol of the subframe, the terminal device stops monitoring the PDCCH on a symbol preceding the three time domain symbols, that is, the terminal device does not monitor the PDCCH on the three time domain symbols.

Figure 8:
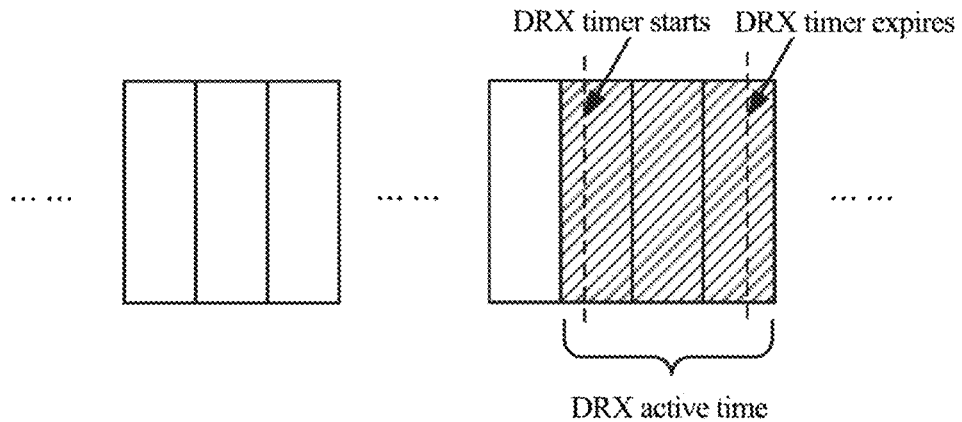
FIG. 8 is a schematic block diagram of a DRX active time according to an implementation of the present disclosure.

As shown in FIG. 8, the DRX active time includes the PDCCH monitoring occasion. Assuming that the network device configures the PDCCH monitoring occasion to be the first three time domain symbols of a subframe, if a DRX timer starts in the first time domain symbol and expires in the third time domain symbol of the sub frame, the terminal device monitors the PDCCH in the three time domain symbols.

Figure 9:
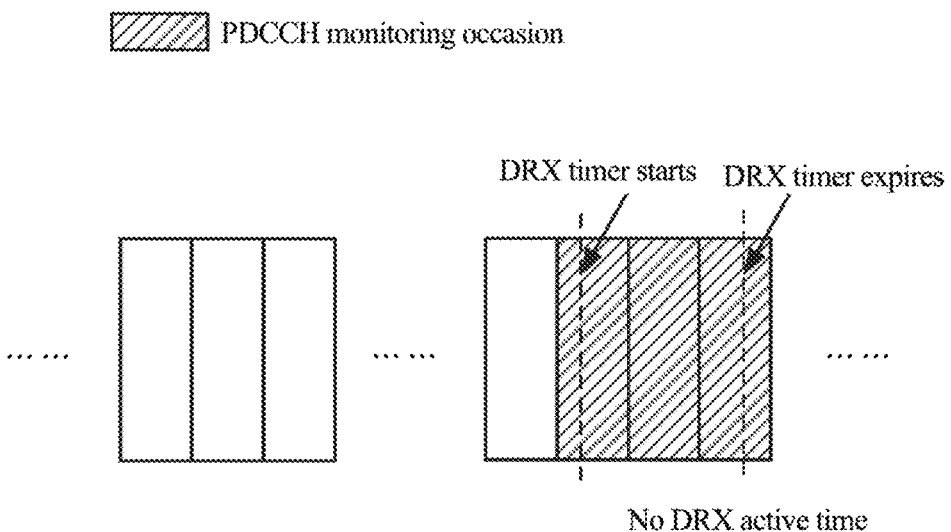
FIG. 9 is a schematic block diagram of a DRX active time according to an implementation of the present disclosure.

As shown in FIG. 9, the DRX active time does not include the PDCCH monitoring occasion. Assuming that the network device configures the PDCCH monitoring occasion to be the first three time domain symbols of a subframe, if a DRX timer starts in the first time domain symbol and expires in the third time domain symbol of the subframe, then the terminal device may not have the DRX active time, that is, the terminal device does not monitor the PDCCH in the three time domain symbols.

Optionally, in FIGS. 6 and 8, if the terminal device detects the PDCCH in the PDCCH monitoring occasion, the terminal device may restart a DRX onDuration Timer, and at this time, the time for monitoring the PDCCH by the terminal device may be prolonged.

Methods for discontinuous reception according to the implementations of the present disclosure have been described in detail above. Devices according to implementations of the present disclosure will be described below with reference to FIGS. 10 to 12. Technical features described in the method implementations are applicable to the following device implementations.

Figure 10:
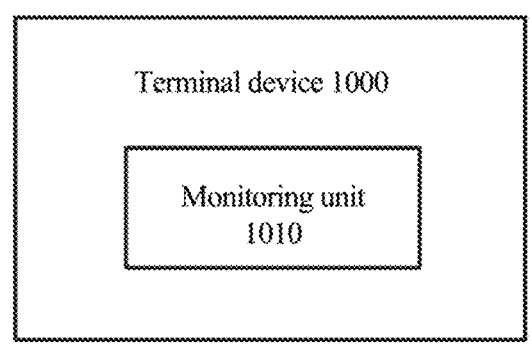
FIG. 10 is a schematic block diagram of a terminal device according to an implementation of the present disclosure.

FIG. 10 is a schematic block diagram of a terminal device 1000 according to an implementation of the present disclosure. As shown in FIG. 10, the terminal device 1000 includes a monitoring unit 1010. The monitoring unit 1010 is configured to monitor a physical downlink control channel (PDCCH) during a DRX active time.

Herein, if a DRX timer starts and/or expires in the PDCCH monitoring occasion, the DRX active time includes the PDCCH monitoring occasion, or the DRX active time does not include the PDCCH monitoring occasion.

Therefore, when the DRX timer starts and/or expires in the PDCCH monitoring occasion, since the DRX active time of the terminal device includes the PDCCH monitoring occasion or the DRX active time does not include the PDCCH monitoring occasion, it can ensure that the terminal device monitors the downlink control channel more effectively.

Optionally, the PDCCH monitoring occasion includes one or more consecutive time domain symbols.

Optionally, the PDCCH monitoring occasion is configured by a network device.

Optionally, the DRX timer is any one of the following timers: a DRX onDuration Timer, a DRX Inactivity Timer, a DRX Retransmission TimerUL, a DRX Retransmission TimerDL, and a Contention Resolution Timer.

Optionally, that the DRX timer starts and/or expires in the PDCCH monitoring occasion includes that a starting or expiry time of the DRX timer is located in the PDCCH monitoring occasion except a starting time and an ending time of the PDCCH monitoring occasion.

Optionally, that the DRX timer starts and/or expires in the PDCCH monitoring occasion includes that a starting time of the DRX timer is located after a starting time of the PDCCH monitoring occasion, and an expiry time of the DRX timer is located before an ending time of the PDCCH monitoring occasion.

Optionally, the terminal device further includes a processing unit, the processing unit is configured to start or restart a DRX onDuration Timer if the PDCCH is detected by the monitoring unit 1010 in the PDCCH monitoring occasion.

It should be understood that the terminal device 1100 may perform corresponding operations performed by the terminal device in the above method 300, which will not be described in detail herein for sake of brevity.

Figure 11:
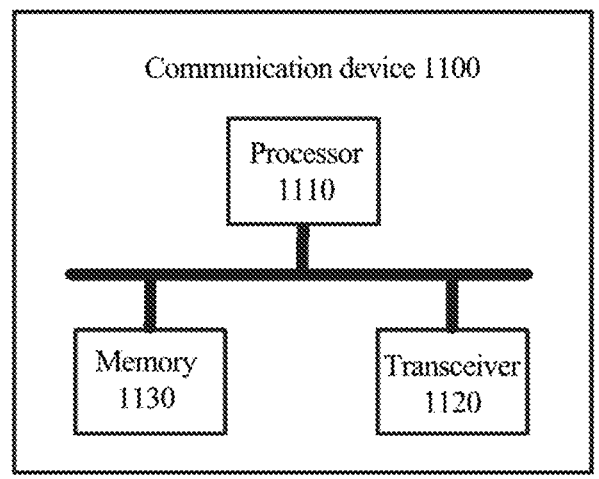
FIG. 11 is a schematic diagram of structure of a terminal device according to an implementation of the present disclosure.

FIG. 11 is a schematic diagram of structure of a terminal device 1100 according to an implementation of the present disclosure. As shown in FIG. 11, the terminal device includes a processor 1110, a transceiver 1120, and a memory 1130, wherein the processor 1110, the transceiver 1120, and the memory 1130 communicate with each other through an internal connection path. The memory 1130 is used for storing instructions, and the processor 1110 is used for executing instructions stored in the memory 1130 to control the transceiver 1120 to send or receive signals.

Optionally, the processor 1110 may call program codes stored in the memory 1130 to perform corresponding operations performed by the terminal device in the method 300, which will not be described here repeatedly for sake of brevity.

It should be understood that the processor in the implementation of the present disclosure may be an integrated circuit chip with a capability for processing signals. In an implementation process, actions of the method implementations described above may be accomplished by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement or perform various methods, acts and logic block diagrams disclosed in implementations of the present disclosure. The general purpose processor may be a microprocessor, or the processor may be any conventional processor or the like. The acts of the methods disclosed in connection with the implementations of the present disclosure may be directly embodied by the execution of the hardware decoding processor, or by execution of a combination of hardware in a decoding processor and software modules. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present disclosure may be a transitory memory or non-transitory memory, or may include both transitory and non-transitory memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods of the present disclosure described herein are intended to include, but not limited to, these and any other suitable types of memories.

Figure 12:
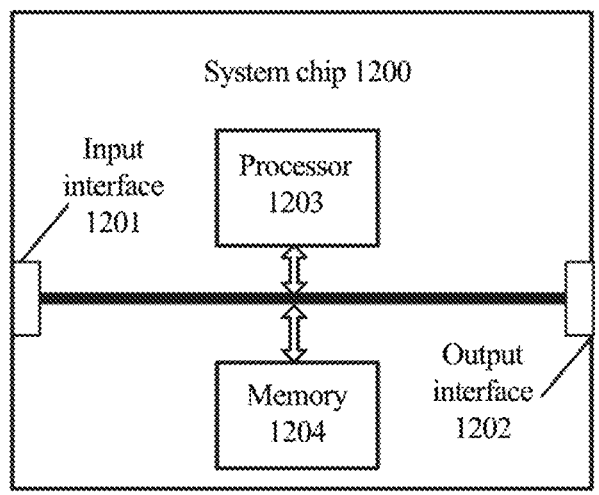
FIG. 12 is a schematic diagram of structure of a system chip according to an implementation of the present disclosure.

FIG. 12 is a schematic diagram of structure of a system chip according to an implementation of the present disclosure. The system chip 1200 of FIG. 12 includes an input interface 1201, an output interface 1202, at least one processor 1203, and a memory 1204. The input interface 1201, the output interface 1202, the processor 1203, and the memory 1204 are connected to each other through an internal connection path. The processor 1203 is used for executing codes in the memory 1204.

Optionally, when the codes are executed, the processor 1203 may implement the operations implemented by the terminal device in the method 300. For sake of brevity, it will not be repeated here.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each specific application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described repeatedly here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementations, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the solution of the implementations.

In addition, various functional units in various implementations of the present disclosure may be integrated in one monitoring unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subjected to the protection scope of the claims.

What is claimed is:

1. A method for discontinuous reception (DRX), comprising:
    starting, by a terminal device, a DRX timer; and
    when a starting time of the DRX timer is located in a first physical downlink control channel (PDCCH) monitoring occasion, not monitoring the PDCCH in the first PDCCH monitoring occasion by means of making an active time of the DRX not comprise an entire time domain length corresponding to the first PDCCH monitoring occasion, wherein the active time of the DRX is a wake-up time of the DRX.

2. The method of claim 1, further comprising:
    when an expiry time of the DRX timer is located in a second PDCCH monitoring occasion, not monitoring the PDCCH in the second PDCCH monitoring occasion.

3. The method of claim 2, further comprising:
    during a period of time within a runtime of the DRX timer except the first PDCCH monitoring occasion and/or the second PDCCH monitoring occasion, monitoring the PDCCH.

4. The method of claim 2, wherein the first PDCCH monitoring occasion comprises one or more consecutive time domain symbols, and the second PDCCH monitoring occasion comprises one or more consecutive time domain symbols.

5. The method of claim 3, wherein the first PDCCH monitoring occasion comprises one or more consecutive time domain symbols, and the second PDCCH monitoring occasion comprises one or more consecutive time domain symbols.

6. The method of claim 2, wherein the first PDCCH monitoring occasion and the second PDCCH monitoring occasion are configured by a network device.

7. The method of claim 3, wherein the first PDCCH monitoring occasion and the second PDCCH monitoring occasion are configured by a network device.

8. The method of claim 1, wherein the DRX timer is any one of the following timers:
    a DRX onDuration Timer, a DRX Inactivity Timer, a DRX Retransmission TimerUL, a DRX Retransmission TimerDL, and a Contention Resolution Timer.

9. The method of claim 2, wherein the DRX timer is any one of the following timers:
    a DRX onDuration Timer, a DRX Inactivity Timer, a DRX Retransmission TimerUL, a DRX Retransmission TimerDL, and a Contention Resolution Timer.

10. The method of claim 2, wherein
    the starting time of the DRX timer being located in the first PDCCH monitoring occasion, comprises that the starting time of the DRX timer is located in a time during the first PDCCH monitoring occasion except for a starting or expiry time of the first PDCCH monitoring occasion; and
    the expiry time of the DRX timer being located in the second PDCCH monitoring occasion, comprises that the expiry time of the DRX timer is located in a time during the second PDCCH monitoring occasion except for a starting or expiry time of the second PDCCH monitoring occasion.

11. A terminal device, comprising a processor, wherein
    the processor is configured to start a discontinuous reception (DRX) timer; and
    the processor is further configured to, when a starting time of the DRX timer is located in a first physical downlink control channel (PDCCH) monitoring occasion, not monitor the PDCCH in the first PDCCH monitoring occasion by means of making an active time of the DRX not comprise an entire time domain length corresponding to the first PDCCH monitoring occasion, wherein the active time of the DRX is a wake-up time of the DRX.

12. The terminal device of claim 11, wherein
    the processor is further configured to, when an expiry time of the DRX timer is located in a second PDCCH monitoring occasion, not monitor the PDCCH in the second PDCCH monitoring occasion.

13. The terminal device of claim 12, wherein
    the processor is further configured to, during a period of time within a runtime of the DRX timer except the first PDCCH monitoring occasion and/or the second PDCCH monitoring occasion, monitor the PDCCH.

14. The terminal device of claim 12, wherein the first PDCCH monitoring occasion comprises one or more consecutive time domain symbols, and the second PDCCH monitoring occasion comprises one or more consecutive time domain symbols.

15. The terminal device of claim 13, wherein the first PDCCH monitoring occasion comprises one or more consecutive time domain symbols, and the second PDCCH monitoring occasion comprises one or more consecutive time domain symbols.

16. The terminal device of claim 12, wherein the first PDCCH monitoring occasion and the second PDCCH monitoring occasion are configured by a network device.

17. The terminal device of claim 13, wherein the first PDCCH monitoring occasion and the second PDCCH monitoring occasion are configured by a network device.

18. The terminal device of claim 11, wherein the DRX timer is any one of the following timers:
a DRX onDuration Timer, a DRX Inactivity Timer, a DRX Retransmission TimerUL, a DRX Retransmission TimerDL, and a Contention Resolution Timer.

19. The terminal device of claim 12, wherein the DRX timer is any one of the following timers:
a DRX onDuration Timer, a DRX Inactivity Timer, a DRX Retransmission TimerUL, a DRX Retransmission TimerDL, and a Contention Resolution Timer.

20. The terminal device of claim 12, wherein
the starting time of the DRX timer being located in the first PDCCH monitoring occasion, comprises that the starting time of the DRX timer is located in a time during the first PDCCH monitoring occasion except for a starting or expiry time of the first PDCCH monitoring occasion; and
the expiry time of the DRX timer being located in the second PDCCH monitoring occasion, comprises that the expiry time of the DRX timer is located in a time during the second PDCCH monitoring occasion except for a starting or expiry time of the first PDCCH monitoring occasion.

* * * * *